(12) United States Patent
Liu et al.

(10) Patent No.: US 11,682,825 B2
(45) Date of Patent: Jun. 20, 2023

(54) DISK DEVICE HAVING AN ANTENNA PROVIDED IN A HOUSING THEREOF

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Jia Liu, Yokohama Kanagawa (JP); Taichi Okano, Yokohama Kanagawa (JP); Kota Tokuda, Fujisawa Kanagawa (JP); Nobuhiro Yamamoto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/725,616

(22) Filed: Apr. 21, 2022

(65) Prior Publication Data

US 2022/0247064 A1 Aug. 4, 2022

Related U.S. Application Data

(63) Continuation of application No. 17/197,722, filed on Mar. 10, 2021, now Pat. No. 11,342,650.

(30) Foreign Application Priority Data

Jul. 30, 2020 (JP) .............................. JP2020-129080

(51) Int. Cl.
*G11B 33/12* (2006.01)
*H01Q 1/22* (2006.01)
(Continued)

(52) U.S. Cl.
CPC ......... *H01Q 1/2258* (2013.01); *G06F 3/0676* (2013.01); *G11B 33/022* (2013.01);
(Continued)

(58) Field of Classification Search
None
See application file for complete search history.

(56) References Cited

U.S. PATENT DOCUMENTS

| 4,818,907 A | 4/1989 | Shirotori |
| 5,282,099 A | 1/1994 | Kawagoe et al. |

(Continued)

FOREIGN PATENT DOCUMENTS

| CN | 111193104 A | 5/2020 |
| CN | 113157608 A | 7/2021 |

(Continued)

OTHER PUBLICATIONS

Notice of Allowance dated Jan. 24, 2022, issued in parent U.S. Appl. No. 17/197,722.

(Continued)

*Primary Examiner* — William J Klimowicz
(74) *Attorney, Agent, or Firm* — Holtz, Holtz & Volek PC (57) ABSTRACT

A disk device includes a housing having a sidewall, the side wall having a first through-hole; a magnetic disk rotatably disposed in the housing and surrounded by the sidewall in a radial direction; a flexible printed circuit electrically connected to the magnetic disk; an insulator closing the first through-hole; a wireless communication device having a first communication antenna inside the housing; and a control board electrically connected to the flexible printed circuit. The control board is supplied with power from outside of the housing via a first connector, and is configured to receive a write command or a read command via the first communication antenna.

12 Claims, 11 Drawing Sheets

(51) Int. Cl.
*G11B 33/02* (2006.01)
*G06F 3/06* (2006.01)
*G11B 19/02* (2006.01)
*G11B 25/04* (2006.01)

(52) U.S. Cl.
CPC ......... *G11B 33/122* (2013.01); *H01Q 1/2283* (2013.01); *G11B 19/02* (2013.01); *G11B 25/043* (2013.01)

(56) References Cited

U.S. PATENT DOCUMENTS

| | | | |
|---|---|---|---|
| 5,414,574 A | 5/1995 | Boutaghou et al. | |
| 5,481,420 A * | 1/1996 | Cardona | G11B 17/0405 360/99.06 |
| 5,650,895 A | 7/1997 | Koizumi et al. | |
| 6,594,107 B2 | 7/2003 | Hayakawa et al. | |
| 7,419,407 B1 * | 9/2008 | Jolly | H01R 13/2435 439/714 |
| 7,830,317 B2 | 11/2010 | Yamazaki | |
| 10,374,345 B2 | 8/2019 | Yamamoto et al. | |
| 10,594,100 B1 | 3/2020 | Namihisa et al. | |
| 10,680,368 B2 | 6/2020 | Yamamoto et al. | |
| 10,903,595 B2 | 1/2021 | Yamamoto et al. | |
| 2003/0080906 A1 | 5/2003 | Miyasaka | |
| 2004/0004145 A1 | 1/2004 | Stamm et al. | |
| 2005/0094312 A1 | 5/2005 | Sato | |
| 2005/0231848 A1 | 10/2005 | Hong et al. | |
| 2006/0190669 A1 | 8/2006 | Lee et al. | |
| 2007/0183271 A1 * | 8/2007 | Ashizaki | G11B 23/0042 369/14 |
| 2008/0055166 A1 | 3/2008 | Kobayashi | |
| 2008/0318447 A1 | 12/2008 | Tomioka et al. | |
| 2009/0135073 A1 | 5/2009 | Yokote et al. | |
| 2009/0322625 A1 * | 12/2009 | Yamazaki | G06F 1/1656 343/702 |
| 2013/0109317 A1 | 5/2013 | Kikuchi et al. | |
| 2014/0250495 A1 * | 9/2014 | Mahanfar | H04L 63/10 720/695 |
| 2018/0097301 A1 | 4/2018 | Yoshida et al. | |
| 2018/0149536 A1 * | 5/2018 | Choe | G01L 9/0007 |
| 2019/0304511 A1 | 10/2019 | Hisakuni et al. | |
| 2019/0378545 A1 | 12/2019 | Sudo et al. | |
| 2020/0294546 A1 | 9/2020 | Yamamoto et al. | |
| 2020/0402545 A1 | 12/2020 | Kaneko et al. | |
| 2021/0225412 A1 | 7/2021 | Okano et al. | |
| 2021/0295876 A1 | 9/2021 | Okano et al. | |
| 2021/0407550 A1 * | 12/2021 | Okano | H01Q 1/2258 |

FOREIGN PATENT DOCUMENTS

| | | |
|---|---|---|
| EP | 1806747 A2 | 7/2007 |
| JP | H04117693 A | 4/1992 |
| JP | H08115590 A | 5/1996 |
| JP | 2002109864 A | 4/2002 |
| JP | 2003036668 A | 2/2003 |
| JP | 2003273622 A | 9/2003 |
| JP | 2005011458 A | 1/2005 |
| JP | 2007193880 A | 8/2007 |
| JP | 2012182791 A | 9/2012 |
| JP | 2014003653 A | 1/2014 |
| JP | 2018121293 A | 8/2018 |
| JP | 2021149985 A | 9/2021 |
| KR | 200384339 Y1 | 5/2005 |
| KR | 20130011622 A | 1/2013 |
| WO | 2011111782 A1 | 9/2011 |
| WO | 2013144296 A1 | 10/2013 |

OTHER PUBLICATIONS

Related U.S. Appl. No. 17/197,873, First Named Inventor: Taichi Okano, Title: "Disk Device"; Filed: Mar. 10, 2021.
Office Action (Non-Final Rejection) dated Sep. 8, 2022, issued in related U.S. Appl. No. 17/197,873.

* cited by examiner

DISK DEVICE HAVING AN ANTENNA PROVIDED IN A HOUSING THEREOF

CROSS-REFERENCE TO RELATED APPLICATIONS

This application is a Continuation application of U.S. application Ser. No. 17/197,722, filed Mar. 10, 2021, which is based upon and claims the benefit of priority from Japanese Patent Application No. 2020-129080, filed Jul. 30, 2020, the entire contents of all of which are incorporated herein by reference.

FIELD

Embodiments described herein relate generally to a disk device.

BACKGROUND

As a disk device, a magnetic disk device comprises a housing comprising a base and a top cover, and a rotatable magnetic disk and an actuator supporting a magnetic head are disposed in the housing. As a method of improving the performance of the disk device, a method of reducing the rotational resistance of the magnetic disk and the magnetic head by sealing a low-density gas such as helium in the housing is proposed.

A through-hole is formed in the housing. In order to maintain airtightness in the housing, the through-hole of the housing is closed by a sealing board. The sealing board is composed of a printed circuit board. The magnetic disk device comprises a control circuit board located outside the housing and fixed to the housing. The control circuit board and the sealing board are connected by a connector. Wired communication can be performed between the control circuit board and a communication unit in the housing by the connector.

BRIEF DESCRIPTION OF THE DRAWINGS

FIG. 13 is an enlarged cross-sectional view showing a part of an HDD according to a modification example 4 of the first embodiment, and is an illustration showing a first through portion, a first insulating member, a first communication antenna and the like.

FIG. 14 is an enlarged cross-sectional view showing a part of an HDD according to a modification example 5 of the first embodiment, and is an illustration showing a first through portion, a first insulating member, a first communication antenna and the like.

DETAILED DESCRIPTION

In general, according to one embodiment, there is provided a disk device comprising a housing comprising a sidewall, a magnetic disk rotatably disposed in the housing and surrounded by the sidewall in a radial direction, a wireless communication device comprising a first communication antenna, and a first insulating member. The sidewall comprises a first through portion. The first insulating member closes the first through portion. The first communication antenna is located in the first through portion, is disposed spaced from the housing, and wirelessly communicates with an outside of the housing.

Embodiments of the present invention will be described hereinafter with reference to the accompanying drawings. The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, elements similar to those described in connection with preceding drawings are denoted by the same reference numbers, and detailed description of them is omitted unless necessary.

A disk device will be described. An embodiment where a disk device is applied to a hard disk drive (HDD) will be described.

First Embodiment

Figure 1:
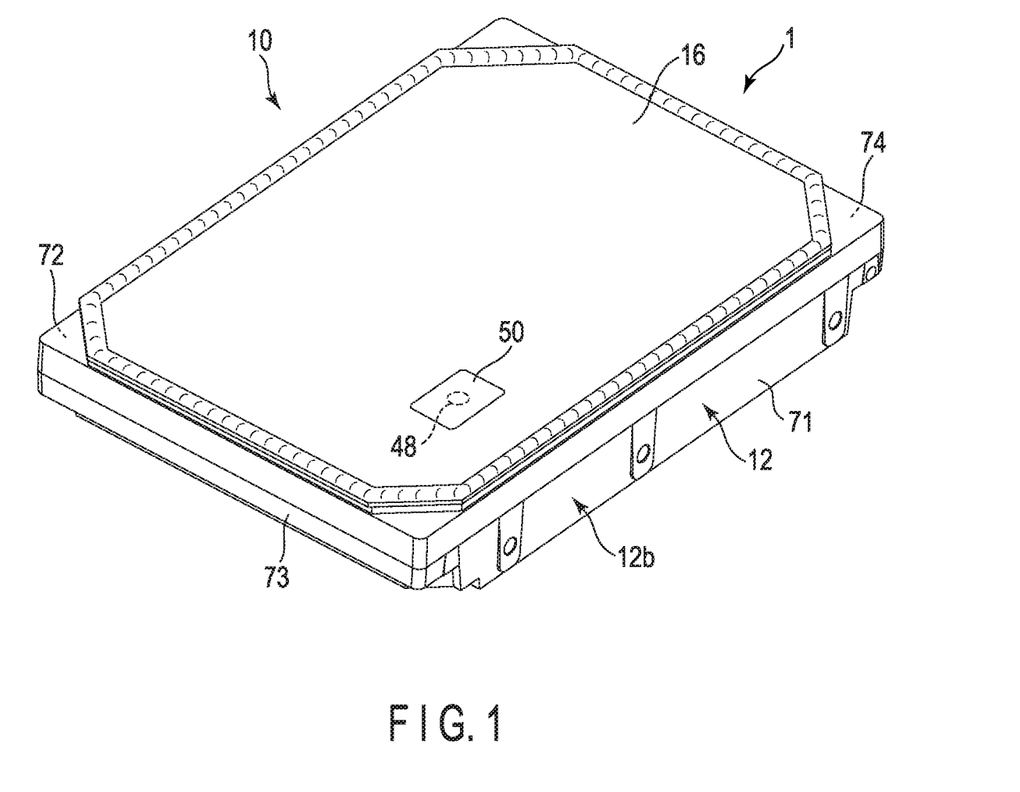
FIG. 1 is a perspective view showing the external appearance of a hard disk drive (HDD) according to the first embodiment.
Figure 2:
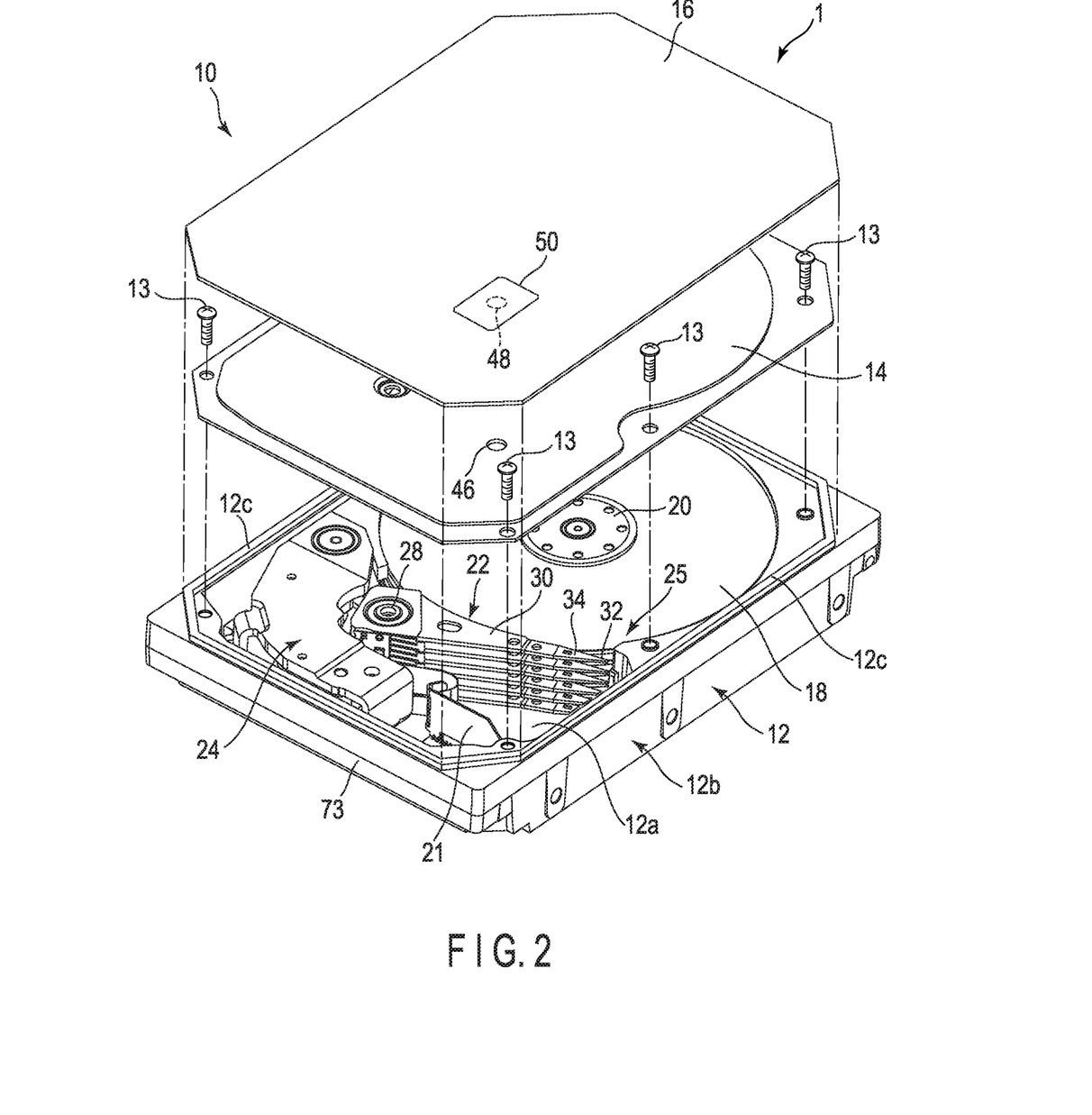
FIG. 2 is an exploded perspective view showing the HDD.

First, the first embodiment will be described. FIG. 1 is a perspective view showing the external appearance of an HDD 1 according to the first embodiment. FIG. 2 is an exploded perspective view showing the internal structure of the HDD 1.

As shown in FIGS. 1 and 2, the HDD 1 comprises a substantially rectangular housing 10. This housing 10 comprises a rectangular box-shaped base 12 whose top face is open, an inner cover 14 which is fixed to the base 12 by a plurality of screws 13 and closes the top opening of the base 12, and an outer cover (top cover) 16 which is superimposed on the inner cover 14 and whose peripheral portion is welded to the base 12. The base 12 comprises a rectangular bottom wall 12a opposed to the inner cover 14 across a space and a sidewall 12b standing along a periphery of the bottom wall 12a, and is integrally formed of aluminum, for example. The sidewall 12b includes a pair of long side walls 71 and 72 opposed to each other and a pair of short side walls 73 and 74 opposed to each other. A substantially rectangular frame-shaped fixing rib 12c is disposed protruding from a top surface of the sidewall 12b.

The inner cover 14 is formed in a rectangular plate shape using stainless steel, for example. The inner cover 14 is fixed inside the fixing rib 12c such that its peripheral portion is pressed against the top surface of the sidewall 12b of the base 12 by the screws 13. The outer cover 16 is formed in a rectangular plate shape using aluminum, for example. The outer cover 16 is formed in slightly larger planar dimensions than the inner cover 14. The outer cover 16 is airtightly fixed such that its peripheral portion is welded to the fixing rib 12c of the base 12 over its entire circumference.

Vent-holes 46 and 48 through which the inside of the housing 10 and the outside communicate with each other are formed in the inner cover 14 and the outer cover 16, respectively. Air in the housing 10 is expelled through the vent-holes 46 and 48, and a low-density gas (an inert gas) having a lower density than air, for example, helium is sealed in the housing 10 through the vent-holes 46 and 48. For example, a sealant 50 is attached to an outer surface of the outer cover 16 so as to close the vent-hole 48. Note that an atmosphere in the housing 10 may be air.

As shown in FIG. 2, a plurality of, for example, five to nine magnetic disks 18 as recording media, and a spindle motor 20 as a drive motor which supports and rotates the magnetic disks 18 are disposed in the housing 10. The spindle motor 20 is disposed on the bottom wall 12a. The magnetic disks 18 each have a diameter of, for example, 95 mm (3.5 inches) and each comprise a magnetic recording layer on their upper surface and/or lower surface. The magnetic disks 18 are each fixed to a hub (not shown) of the spindle motor 20 such that they are each coaxially fitted to the hub and cramped by a cramp spring. Accordingly, the magnetic disks 18 are each supported parallel to the bottom wall 12a of the base 12. The magnetic disks 18 are rotated at a predetermined rotational rate by the spindle motor 20. The magnetic disks 18 are rotatably disposed.

In the present embodiment, five to nine magnetic disks 18 are accommodated in the housing 10. However, the number of magnetic disks 18 is not limited to this. In addition, a single magnetic disk 18 may be accommodated in the housing 10.

A plurality of magnetic heads 32 as a plurality of heads which record and reproduce information on and from the magnetic disks 18, and a head stack assembly (actuator) 22 which supports the magnetic heads 32 movably with respect to the magnetic disks 18 are disposed in the housing 10. In addition, a voice coil motor (hereinafter referred to as a VCM) 24 which rotates and positions the head stack assembly 22, a ramped loading mechanism 25 which holds the magnetic heads 32 at an unloading position away from the magnetic disks 18 when the magnetic heads 32 are moved to outermost circumferences of the magnetic disks 18, and a board unit (first internal wiring member) 21 on which an electronic component such as a conversion connector is mounted are disposed in the housing 10.

The board unit 21 is composed of a flexible printed circuit (FPC). This FPC is electrically connected to the magnetic heads 32 and a voice coil of the VCM 24 via a relay FPC on the head stack assembly 22. Note that the board unit 21 may be a rigid flexible printed wiring board including both a rigid portion and a flexible portion.

The head stack assembly 22 comprises a rotatable bearing unit 28, a plurality of arms 30 extending from the bearing unit 28, and suspensions 34 extending from the respective arms 30. The magnetic heads 32 are supported on distal end portions of the respective suspensions 34.

Figure 3:
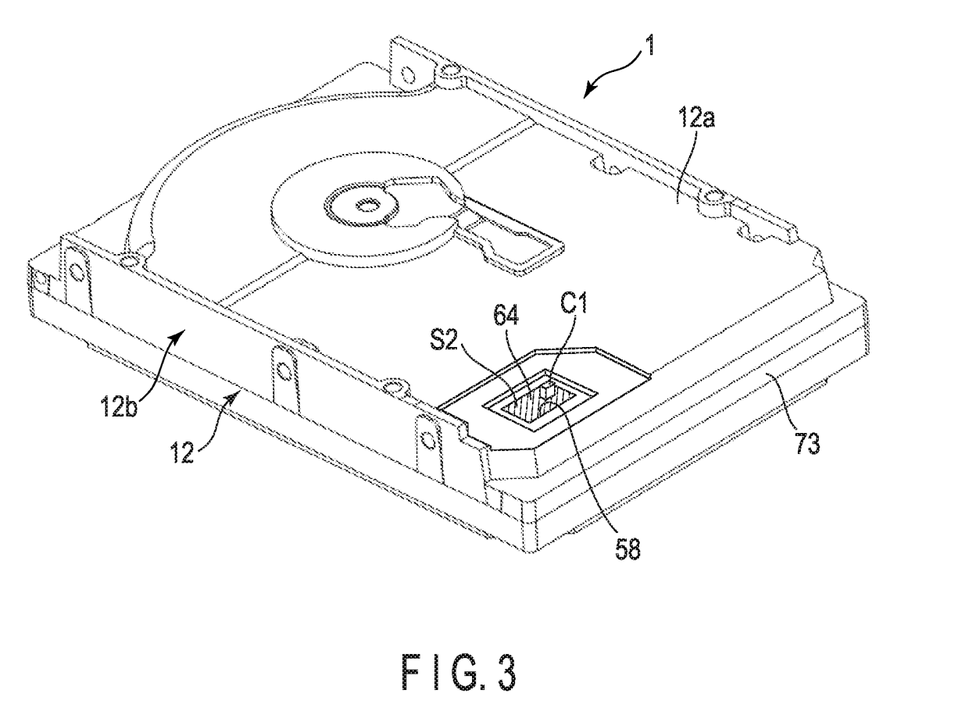
FIG. 3 is a perspective view showing a rear surface side of a base of the HDD.

FIG. 3 is a perspective view showing a rear surface side of the housing 10 of the HDD 1.

As shown in FIG. 3, in the bottom wall 12a of the base 12, for example, a rectangular through-hole (hole) 58 is formed in an end portion of its one short side. The through-hole 58 is opened in an inner surface and an outer surface (rear surface) of the bottom wall 12a. The through-hole 58 is closed by a control board 64. In the present embodiment, the control board 64 is formed of a printed wiring board (PWB).

The HDD 1 further comprises a first connector C1. The first connector C1 functions as a power supply connector. The control board 64 comprises an outer surface S2 exposed to the outside of the housing 10. The first connector C1 is mounted on the outer surface S2 of the control board 64. In the present embodiment, the control board 64 is wiredly supplied with power from the outside of the HDD 1 via the first connector C1. However, the HDD 1 may be wirelessly supplied with power from the outside. As will be described later, the HDD 1 wiredly communicates with the outside of the HDD.

Figure 4:
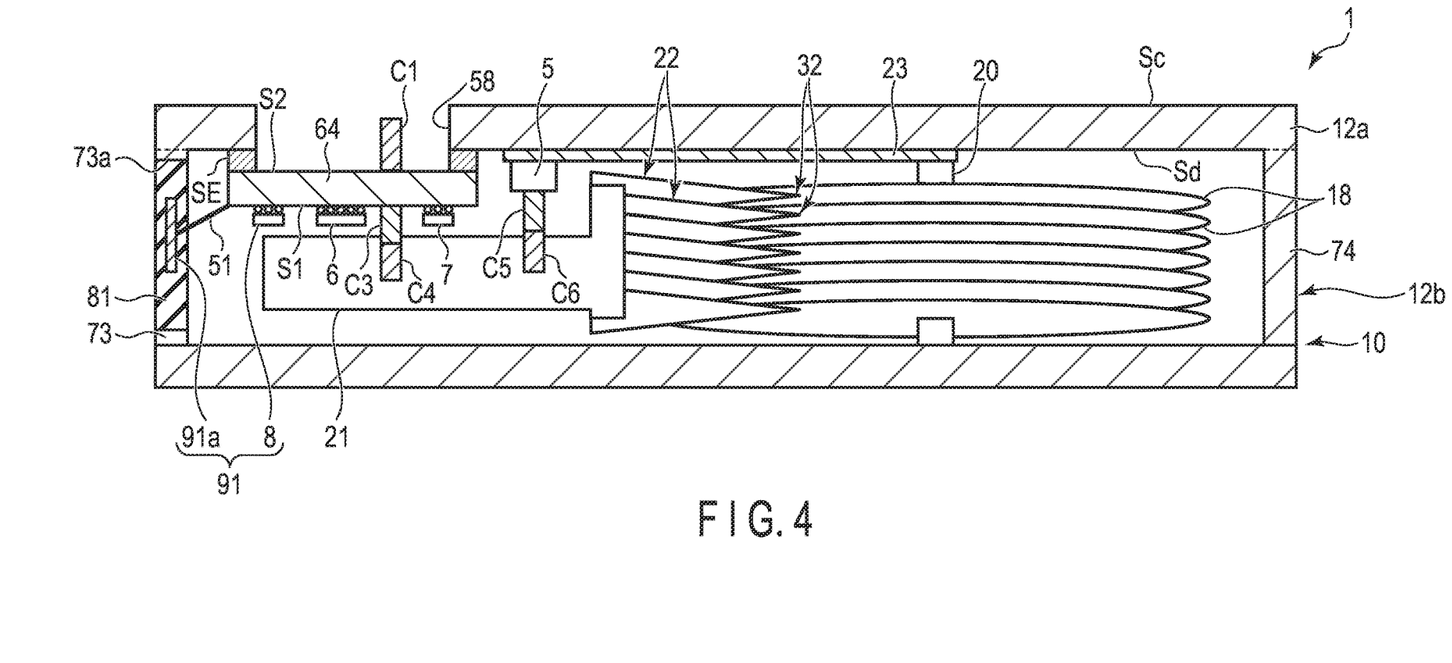
FIG. 4 is a cross-sectional view showing the HDD.

FIG. 4 is a cross-sectional view showing the HDD 1. As shown in FIG. 4, the through-hole 58 is formed in the bottom wall 12a of the housing 10. The bottom wall 12a comprises an outer surface (rear surface) Sc and an inner surface Sd.

The control board 64 comprises an inner surface S1 facing the inside of the housing 10 and the outer surface S2 exposed to the outside of the housing 10. The control board 64 is located inside the housing 10. The HDD 1 comprises a frame-shaped adhesive member SE continuously disposed over the entire circumference around the through-hole 58. The adhesive member SE is located between the inner surface Sd of the bottom wall 12a and the outer surface S2 of the control board 64. The control board 64 is bonded to the inner surface Sd of the bottom wall 12a by the adhesive member SE. The control board 64 closes the through-hole 58 together with the adhesive member SE.

Alternatively, the control board 64 may be located outside the housing 10, and the adhesive member SE may be located between the outer surface Sc of the bottom wall 12a and the inner surface S1 of the control board 64. In that case, the control board 64 is bonded to the outer surface Sc of the bottom wall 12a by the adhesive member SE.

The first connector C1 is electrically connected to the control board 64. Here, the first connector C1 is one of a pair of connectors which are fitted together. In the present embodiment, the first connector C1 is a concave connector (receptacle). The first connector C1 transmits power supplied from the outside of the housing 10 to the control board 64 by wired power supply. Note that the HDD 1 further comprises a secondary battery 5 which is a rechargeable battery inside the housing 10. Accordingly, power transmitted to the inside of the housing 10 via the first connector C1 and the like can be stored in the secondary battery 5.

The HDD 1 further comprises a first insulating member 81, a wireless communication device 91, a board unit (second internal wiring member) 23, a CPU 6, a motor control IC 7, a third connector C3, a fourth connector C4, a fifth connector C5 and a sixth connector C6.

Figure 5:
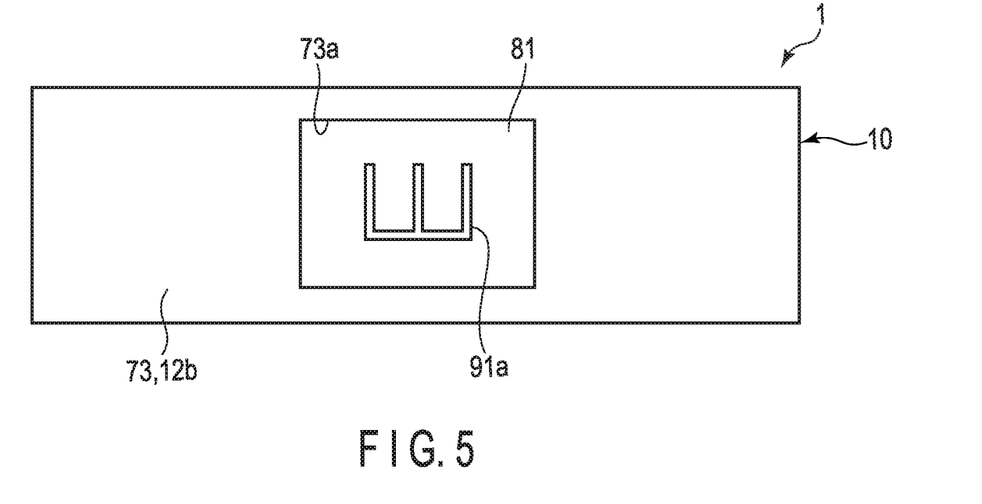
FIG. 5 is a side view when the HDD is viewed from a first through portion side.

FIG. 5 is a side view when the HDD 1 is viewed from a first through portion 73a side.

As shown in FIGS. 4 and 5, a short side wall 73 (sidewall 12b) comprises a first through portion 73a. In the present embodiment, the first through portion 73a is an opening. The head stack assembly (actuator) 22 is located between the magnetic disks 18 and the first through portion 73a (the short side wall 73).

The first insulating member 81 closes the first through portion 73a. The first insulating member 81 is formed of, for example, resin. Since the first insulating member 81 airtightly closes the first through portion 73a, mixing of foreign objects such as dust into the inside of the housing 10 can be suppressed.

The wireless communication device 91 comprises a first communication antenna 91a and a wireless control IC 8. The first communication antenna 91a is located in the first through portion 73a and is disposed spaced from the housing 10. In the present embodiment, the first communication antenna 91a is a pattern antenna and is disposed with a space of greater than or equal to several millimeters from the housing 10. This space can be adjusted according to usage and communication standard. Accordingly, the first communication antenna 91a can wirelessly communicate with the outside of the housing 10, and radio waves are less likely to be blocked by the housing 10. The first communication antenna 91a is surrounded by the first insulating member 81 and is physically and electrically protected. The first communication antenna 91a is supported by the first insulating member 81.

In the present embodiment, the HDD 1 further comprises a coaxial cable 51 connected to the first communication antenna 91a. The coaxial cable 51 is electrically connected to the wireless control IC 8. In the present embodiment, the coaxial cable 51 is connected to the control board 64 via a connector (not shown) and is connected to the wireless control IC 8 via the control board 64 and the like.

As shown in FIG. 4, the CPU 6, the motor control IC 7 and the wireless control IC 8 are mounted on the inner surface S1 of the control board 64. The CPU 6, the motor control IC 7, the wireless control IC 8 and the like function as electronic components which assist a control operation for recording and reproducing information on and from the magnetic disks 18.

The CPU 6, the motor control IC 7 and the wireless control IC 8 can be accommodated inside the housing 10. As compared with when a printed wiring board is disposed outside the housing 10, and the CPU 6, the motor control IC 7 and the wireless control IC 8 are mounted on the printed wiring board, the size of the housing 10 can be increased, and the internal space of the housing 10 can be expanded.

Electronic components other than a connector such as various memories such as a RAM, a ROM and a buffer memory, a coil and a capacitor are also mounted on the control board 64. Furthermore, an electronic component which controls the operation of the spindle motor 20, an electronic component which controls the operation of the VCM 24 and an electronic component which controls the operation of the magnetic heads 32 are also mounted on the control board 64.

Together with the CPU 6, the motor control IC 7 and the wireless control IC 8, the control board 64 controls the operation of the spindle motor 20, and controls the operations of the VCM 24 and the magnetic heads 32 via the board unit 21. In addition, together with the CPU 6, the motor control IC 7 and the wireless control IC 8, the control board 64 can receive power supply via the first connector C1, and can receive various pieces of data such as access commands (control signals) such as a write command and a read command and transmit various pieces of data via the first communication antenna 91a.

The third connector C3 is mounted on the inner surface S1 of the control board 64 and is electrically connected to the control board 64. The fourth connector C4 is electrically connected to the board unit 21. The fourth connector C4 is connected to the third connector C3. Here, the third connector C3 is one of a pair of connectors which are fitted together, and the fourth connector C4 is the other of the pair of connectors which are fitted together. In the present embodiment, the third connector C3 is a concave connector and the fourth connector C4 is a convex connector (plug).

The secondary battery 5 is disposed inside the housing 10. The board unit 23 is electrically connected to the secondary battery 5. The fifth connector C5 is electrically connected to the secondary battery 5. The sixth connector C6 is electrically connected to the board unit 21. The sixth connector C6 is connected to the fifth connector C5. Here, the fifth connector C5 is one of a pair of connectors which are fitted together, and the sixth connector C6 is the other of the pair of connectors which are fitted together. In the present embodiment, the fifth connector C5 is a concave connector and the sixth connector C6 is a convex connector.

The secondary battery 5 is electrically connected to the first connector C1 (the power supply connector) via the fifth connector C5, the sixth connector C6, a wiring line of the board unit 21, the fourth connector C4, the third connector C3 and the control board 64. The first connector C1 is used for power supply but is not used for communication. The number of pins of the first connector C1 is at least two. Since the first connector C1 can be downsized, the through-hole 58 and the control board 64 can be downsized.

The board unit 21 is electrically connected to the magnetic heads 32. The fourth connector C4 is electrically connected to the magnetic heads 32 and the VCM 24 via the board unit 21.

The board unit 23 is disposed inside the housing 10 and is electrically connected to the spindle motor 20. In the present embodiment, the board unit 23 is composed of an FPC. The board unit 23 may be a rigid flexible printed wiring board. The fourth connector C4 is electrically connected to the spindle motor 20 via the board unit 23 and the like. The magnetic heads 32, the VCM 24, the spindle motor 20 and the like can be driven by power obtained by wired power supply.

Figure 6:
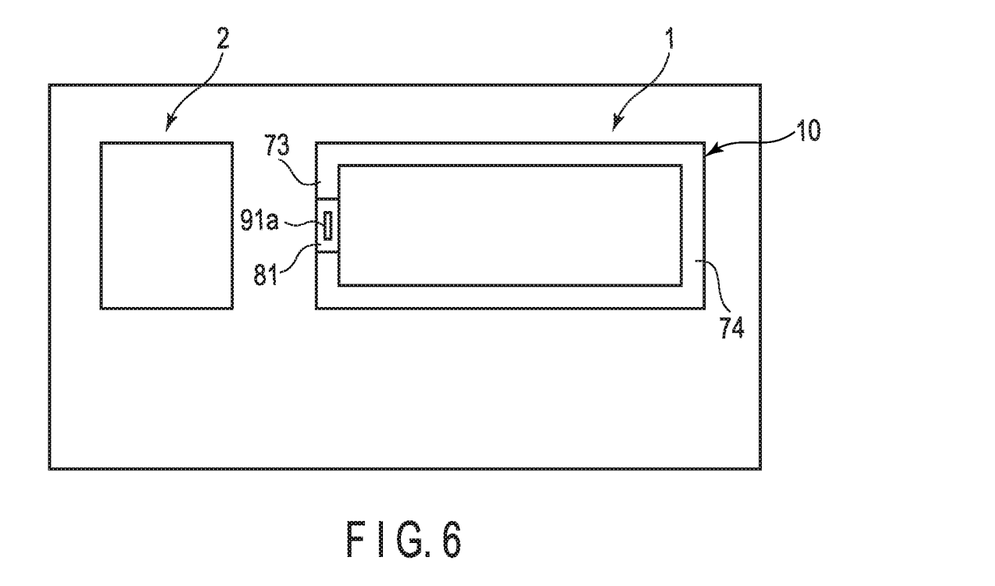
FIG. 6 is a block diagram showing a PC comprising the HDD and a wireless communication module.

FIG. 6 is a block diagram showing a personal computer (PC) comprising the HDD 1 and a wireless communication module 2.

As shown in FIG. 6, the HDD 1 is used in a PC, for example. The HDD 1 is disposed in the PC such that the short side wall 73 (the first communication antenna 91a) is opposed to the wireless communication module 2. Accordingly, the first communication antenna 91a can wirelessly communicate with a communication antenna of the wireless communication module 2.

According to the HDD 1 of the first embodiment composed as described above, the HDD comprises the housing 10 comprising the sidewall 12b, the magnetic disks 18, the wireless communication device 91 comprising the first communication antenna 91a, and the first insulating member 81. The first insulating member 81 closes the first through portion 73a of the sidewall 12b. The first communication antenna 91a is located in the first through portion 73a, is disposed spaced from the housing 10, and wirelessly communicates with the outside of the housing. Therefore, the HDD capable of wirelessly communicating with the outside can be obtained.

Second Embodiment

Figure 7:
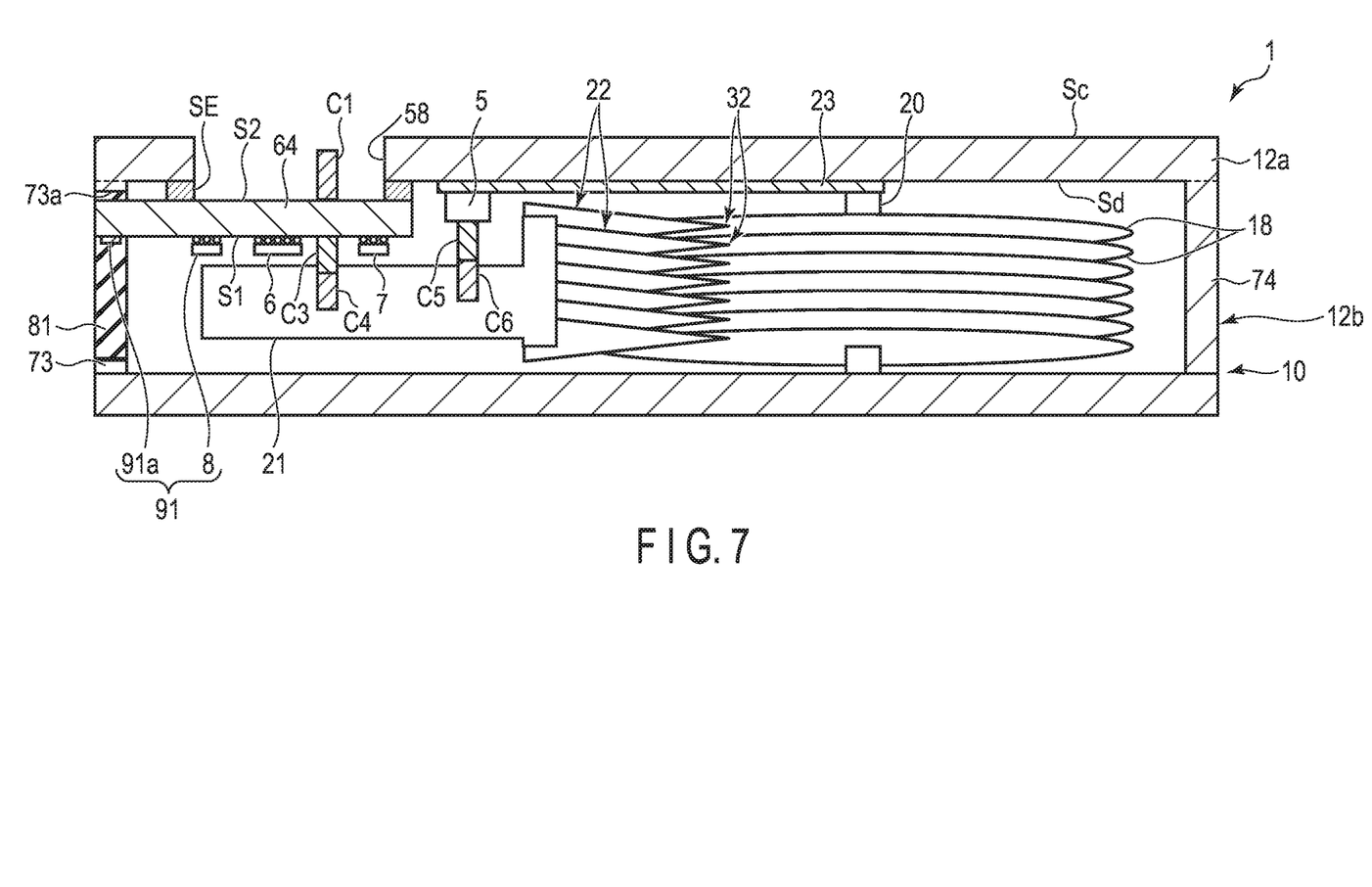
FIG. 7 is a cross-sectional view showing an HDD according to the second embodiment.

Next, the second embodiment will be described. In the second embodiment, differences from the first embodiment will be described. FIG. 7 is a cross-sectional view showing an HDD 1 according to the second embodiment.

As shown in FIG. 7, the bottom wall 12a is opposed to the magnetic disks 18 in a direction along the central axis of the magnetic disks 18. The control board 64 is located inside the housing 10 and closes the through-hole 58 formed in the bottom wall 12a. The control board 64 extends from a region opposed to the through-hole 58 to the first through portion 73a.

The HDD is composed without the coaxial cable 51. The first communication antenna 91a is mounted on the control board 64 and is electrically connected to the control board 64. Alternatively, the first communication antenna 91a may be formed in the control board 64. The first insulating member 81 closes the first through portion 73a together with the control board 64. The first communication antenna 91a is covered with the first insulating member 81.

Also from the HDD 1 of the second embodiment composed as described above, effects similar to those obtained from the HDD 1 of the first embodiment can be obtained.

Third Embodiment

Figure 8:
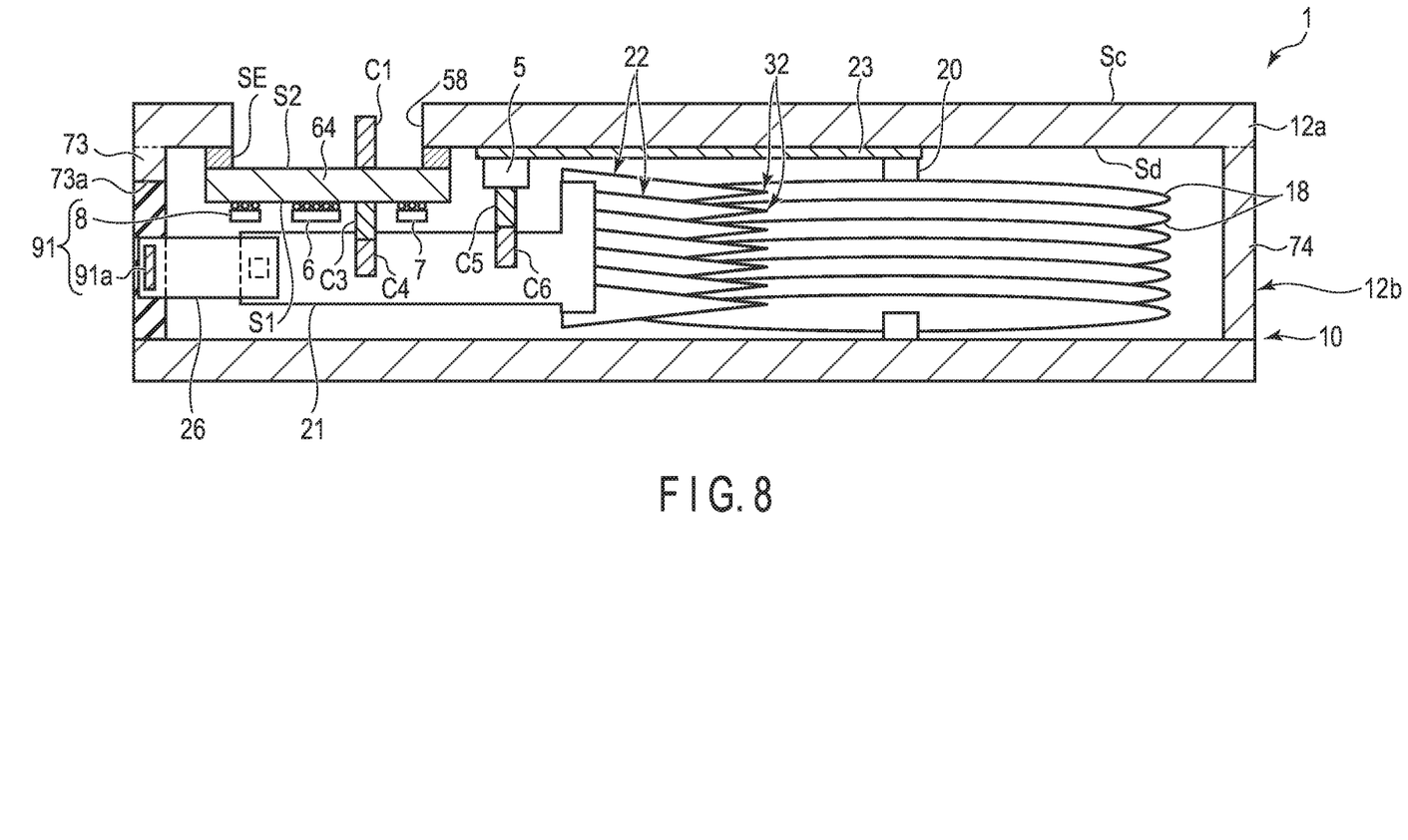
FIG. 8 is a cross-sectional view showing an HDD according to the third embodiment.
Figure 9:
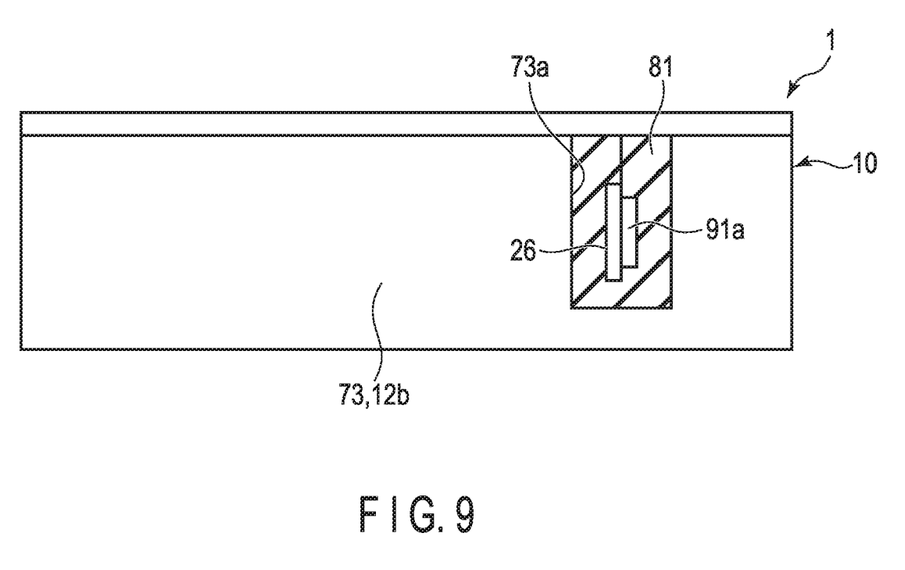
FIG. 9 is a side view when the HDD according to the third embodiment is viewed from a first through portion side.

Next, the third embodiment will be described. In the third embodiment, differences from the first embodiment will be described. FIG. 8 is a cross-sectional view showing an HDD 1 according to the third embodiment. FIG. 9 is a side view when the HDD 1 according to the third embodiment is viewed from the first through portion 73a side. In FIG. 9, hatch lines are added to the first insulating member 81.

As shown in FIGS. 8 and 9, the HDD 1 further comprises a board unit (third internal wiring member) 26. The board unit 26 is composed of an FPC. The first communication antenna 91a is mounted on the board unit 26. Alternatively, the first communication antenna 91a may be formed in the board unit 26.

The board unit 26 is connected to the board unit 21 via a connector. Alternatively, the board unit 26 may be integrally formed with the board unit 21. The first communication antenna 91a is electrically connected to the wireless control IC 8 via the board unit 26, the board unit 21, the fourth connector C4, the third connector C3 and the control board 64.

The first through portion 73a is a slit formed in the short side wall 73 (the sidewall 12b). The first insulating member 81 enfolds the first communication antenna 91a and is embedded in the first through portion 73a together with the first communication antenna 91a. In the present embodiment, the first insulating member 81 is bent and enfolds the first communication antenna 91a together with the board unit 26, and is embedded in the first through portion 73a together with the first communication antenna 91a and the board unit 26. The first insulating member 81 closes the first through portion 73a together with the first communication antenna 91a and the board unit 26. The first communication antenna 91a is supported together with the board unit 26 by the first insulating member 81.

Also from the HDD 1 of the third embodiment composed as described above, effects similar to those obtained from the HDD 1 of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, two or more of the above embodiments and the following modification examples may be arbitrarily combined together.

Modification Example 1 of First Embodiment

Figure 10:
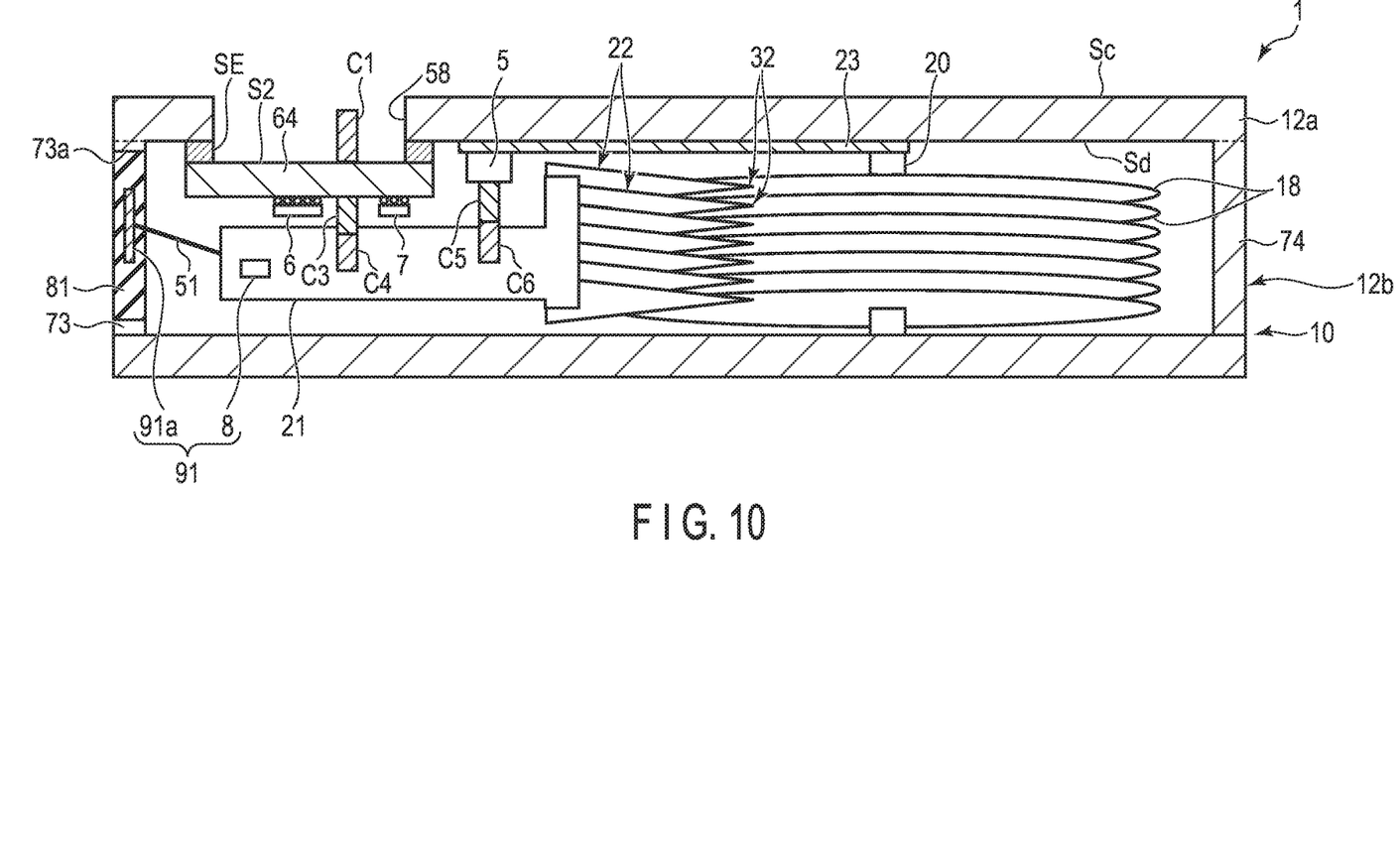
FIG. 10 is a cross-sectional view showing an HDD according to a modification example 1 of the first embodiment.

As shown in FIG. 10, the wireless IC 8 is mounted on the board unit 21. The coaxial cable 51 is not connected to the control board 64. The coaxial cable 51 is connected to the board unit 21 on which the wireless control IC 8 is mounted.

Modification Example 2 of First Embodiment

Figure 11:
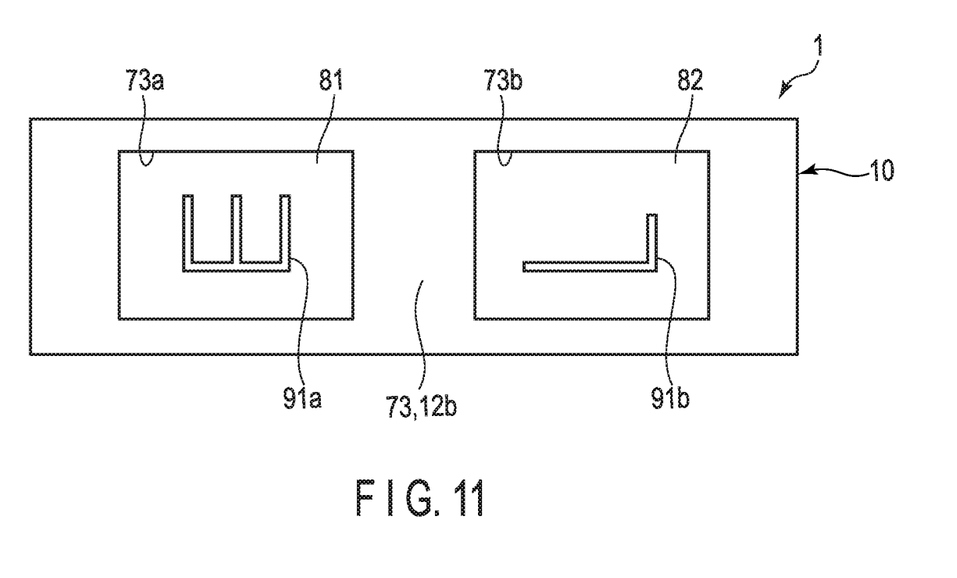
FIG. 11 is a side view when an HDD according to a modification example 2 of the first embodiment is viewed from a first through portion and second through portion side.

As shown in FIG. 11, the HDD 1 further comprises a second insulating member 82. The short side wall 73 (the sidewall 12b) further comprises a second through portion 73b. The second insulating member 82 airtightly closes the second through portion 73b. The wireless communication device 91 further comprises a second communication antenna 91b. The second communication antenna 91b is located in the second through portion 73b and is disposed spaced from the housing 10. The second communication antenna 91b wirelessly communicates with the outside of the housing 10.

In the modification example 2, the frequency band of radio waves handled by the first communication antenna 91a and the frequency band of radio waves handled by the second communication antenna 91b are different from each other. Therefore, it is possible to perform a short-range wireless communication by one communication antenna and a long-range wireless communication by the other communication antenna. Alternatively, it is possible to handle communications in different frequency bands (for example, 2.4 GHz and 5 GHz of a WLAN).

The first communication antenna 91a and the second communication antenna 91b may not be located on the short side wall 73 side but may be located on any of a long side wall 71 side, a long side wall 72 side and a short side wall 74 side.

In addition, the frequency band of radio waves handled by the first communication antenna 91a and the frequency band of radio waves handled by the second communication antenna 91b may be the same.

Modification Example 3 of First Embodiment

Figure 12:
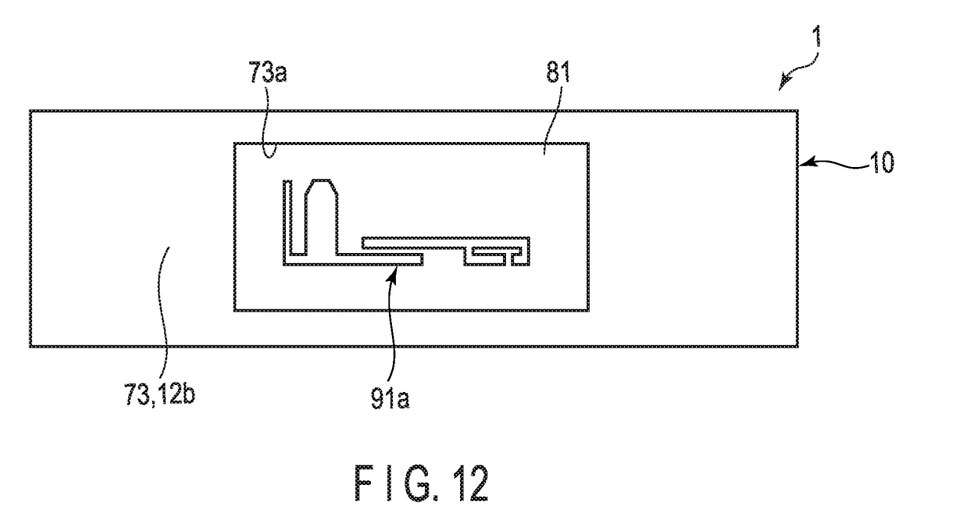
FIG. 12 is a side view when an HDD according to a modification example 3 of the first embodiment is viewed from a first through portion side.

As shown in FIG. 12, the first communication antenna 91a of the HDD 1 may handle radio waves of two frequency bands. For example, it is possible to handle communications in different frequency bands by one antenna (for example, 2.4 GHz and 5 GHz of a WLAN).

Modification Example 4 of First Embodiment

Figure 13:
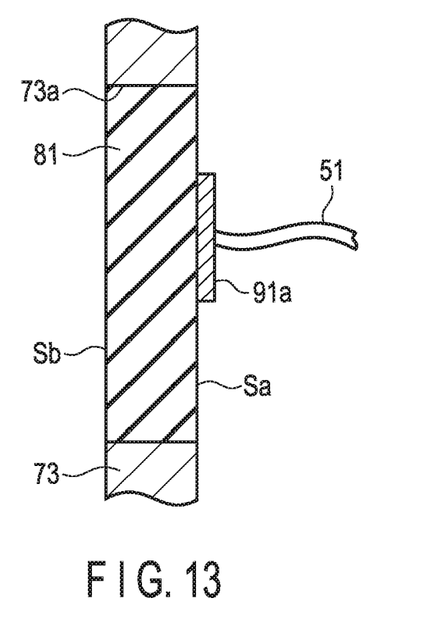

As shown in FIG. 13, the first insulating member 81 comprises an inner surface Sa facing the inside of the housing 10 and an outer surface Sb exposed to the outside of the housing 10. The first communication antenna 91a may be disposed on the inner surface Sa of the first insulating member 81. The first communication antenna 91a is supported by the first insulating member 81. The coaxial cable 51 is connected to the first communication antenna 91a. Alternatively, an FPC may be connected to the first communication antenna 91a.

Modification Example 5 of First Embodiment

Figure 14:
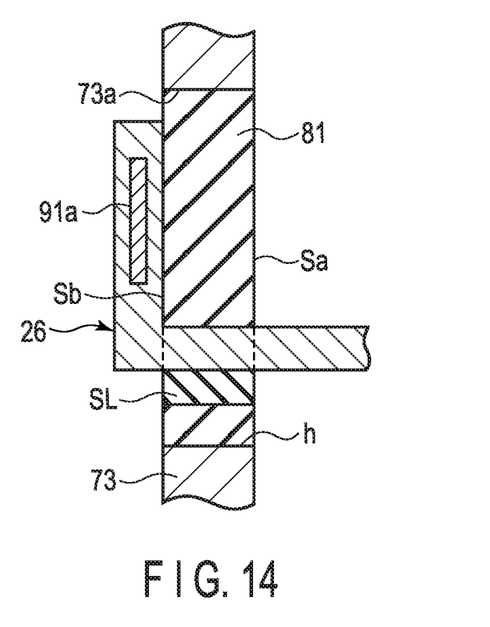

As shown in FIG. 14, an insertion hole h is formed in the first insulating member 81. The insertion hole h is opened in the inner surface Sa and the outer surface Sb of the first insulating member 81. The first communication antenna 91*a* is formed in the board unit 26 as an FPC. The board unit 26 is drawn through the insertion hole h, is located outside the housing 10 and is mounted on the outer surface Sb. The first communication antenna 91*a* is opposed to the outer surface Sb. As described above, the first communication antenna 91*a* may be disposed on the outer surface Sb of the first insulating member 81. The first communication antenna 91*a* is supported together with the board unit 26 by the first insulating member 81. A sealant SL fills the insertion hole h and closes the insertion hole h together with the board unit 26.

Other Modification Examples

When the first communication antenna 91*a* and the second communication antenna 91*b* are pattern antennas, the first communication antenna 91*a* and the second communication antenna 91*b* are formed of various conductors. The first communication antenna 91*a* and the second communication antenna 91*b* may be formed of copper as a conductor having low resistance. Alternatively, the first communication antenna 91*a* and the second communication antenna 91*b* may be formed of aluminum which is the same material as the housing 10. Alternatively, the first communication antenna 91*a* and the second communication antenna 91*b* may be formed of another material having high conductivity.

The communication antenna of each of the first communication antenna 91*a* and the second communication antenna 91*b* is not limited to a pattern antenna but may be an antenna other than a pattern antenna such as an external antenna, a chip antenna and a coaxial antenna.

What is claimed is:

1. A disk device comprising:
   a housing comprising a sidewall, the sidewall having a first through-hole formed therethrough;
   a magnetic disk rotatably disposed in the housing and surrounded by the sidewall in a radial direction;
   a flexible printed circuit electrically connected to the magnetic disk;
   an insulator closing the first through-hole;
   a wireless communication device comprising a first communication antenna, the wireless communication device being provided inside the housing; and
   a control board electrically connected to the flexible printed circuit,
   wherein:
   the control board is supplied with power from outside of the housing via a first connector,
   the control board is configured to receive a write command or a read command via the first communication antenna,
   the control board comprises an outer surface exposed to the outside of the housing, and
   the first connector is mounted on the outer surface of the control board.

2. The disk device of claim 1, wherein the control board is connected to the flexible printed circuit via a second connector.

3. The disk device of claim 2, wherein:
   the control board further comprises an inner surface facing an inside of the housing, and
   the second connector is provided on the inner surface of the control board.

4. The disk device of claim 1, further comprising a coaxial cable connected to the first communication antenna.

5. The disk device of claim 4, further comprising a control IC provided on the control board, the control IC being connected to the first communication antenna via the coaxial cable.

6. The disk device of claim 1, further comprising a second communication antenna which wirelessly communicates with the outside of the housing,
   wherein a frequency band of radio waves handled by the first communication antenna is different from a frequency band of radio waves handled by the second communication antenna.

7. A disk device comprising:
   a housing comprising a sidewall, the sidewall having a first through-hole formed therethrough;
   a magnetic disk rotatably disposed in the housing and surrounded by the sidewall in a radial direction;
   a flexible printed circuit electrically connected to the magnetic disk;
   an insulator provided on the sidewall;
   a wireless communication device provided on the sidewall, the wireless communication device comprising a first communication antenna; and
   a control board electrically connected to the flexible printed circuit,
   wherein:
   the control board is supplied with power from outside of the housing via a first connector,
   the control board is configured to receive a write command or a read command via the first communication antenna,
   the control board comprises an outer surface exposed to the outside of the housing, and
   the first connector is mounted on the outer surface of the control board.

8. The disk device of claim 7, wherein the control board is connected to the flexible printed circuit via a second connector.

9. The disk device of claim 8, wherein:
   the control board further comprises an inner surface facing an inside of the housing, and
   the second connector is provided on the inner surface of the control board.

10. The disk device of claim 7, further comprising a coaxial cable connected to the first communication antenna.

11. The disk device of claim 10, further comprising a control IC provided on the control board, the control IC being connected to the first communication antenna via the coaxial cable.

12. The disk device of claim 7, further comprising a second communication antenna which wirelessly communicates with the outside of the housing,
    wherein a frequency band of radio waves handled by the first communication antenna is different from a frequency band of radio waves handled by the second communication antenna.

* * * * *